United States Patent
Parker

[15] 3,674,734
[45] July 4, 1972

[54] THERMOSETTING ACRYLIC ENAMEL

[72] Inventor: Fred W. Parker, Flint, Mich.

[73] Assignee: E. I. du Pont de Nemours and Company, Wilmington, Del.

[22] Filed: March 12, 1971

[21] Appl. No.: 123,897

Related U.S. Application Data

[63] Continuation-in-part of Ser. No. 728,904, May 14, 1968, abandoned, and a continuation-in-part of Ser. No. 81,629, Oct. 16, 1970, abandoned.

[52] U.S. Cl. .............. 260/31.2 N, 117/132 A, 117/132 BF, 117/138.8 E, 117/138.8 UA, 204/181, 260/32.8 N, 260/33.2 R, 260/33.4 R, 260/33.6 UA, 260/39 R, 260/41 R, 260/41 A, 260/41 B, 260/41 C, 260/855
[51] Int. Cl. .................................... C08f 45/36, B01k 5/02
[58] Field of Search .................. 260/39 R, 855, 41 R, 41 A, 260/41 B, 41 C, 31.2 N, 32.8 N, 33.4 R, 33.6 UA, 33.2 R; 117/132 A, 132 BF, 138.8 E, 138.8 UA

[56] References Cited

UNITED STATES PATENTS

| | | | |
|---|---|---|---|
| 2,681,897 | 6/1954 | Frazier et al. | 260/850 |
| 2,923,653 | 2/1960 | Matlin et al. | 162/142 |
| 2,940,943 | 6/1960 | Christenson et al. | 260/15 |
| 3,002,959 | 10/1961 | Hicks | 260/88.1 |
| 3,338,860 | 8/1967 | Vasta | 260/33.4 |
| 3,365,414 | 1/1968 | Fisk et al. | 260/33.4 |
| 3,375,227 | 3/1968 | Hicks | 260/47 |

OTHER PUBLICATIONS

Robinson et al.– J. Oil Color Chem. Assn. 50, 25– 39 and 42– 47 (1967)

*Primary Examiner*—Morris Liebman
*Assistant Examiner*—H. H. Fletcher
*Attorney*—Hilmar L. Fricke

[57] ABSTRACT

The thermosetting acrylic enamel has as the film-forming constituents a blend of:

1. Interpolymer A which consists essentially of styrene; methyl methacrylate; a soft constituent which is either an alkyl acrylate, or an alkyl methacrylate; hydroxy alkyl acrylate or methacrylate and an $\alpha,\beta$-ethylenically unsaturated monocarboxylic acid;
2. Interpolymer B which consists essentially of styrene or methyl methacrylate, a soft constituent described above, hydroxy alkyl acrylate or methacrylate and an $\alpha,\beta$-ethylenically unsaturated monocarboxylic acid; and
3. a heat reactive condensate.

The thermosetting acrylic enamel is useful as a finish for automobiles and trucks and can be used as a finish for plastics.

12 Claims, No Drawings

THERMOSETTING ACRYLIC ENAMEL

CROSS REFERENCE TO RELATED APPLICATIONS

This application is a continuation-in-part application of my copending application, Ser. No. 728,904, filed May 14, 1968 and of my copending application, Ser. No. 81,629, filed Oct. 16, 1970, both now abandoned.

BACKGROUND OF THE INVENTION

This invention relates to a thermosetting acrylic enamel and in particular to a thermosetting acrylic coating composition that cures to a tough hard film at a relatively low temperature.

Thermosetting acrylic coating compositions as shown in Frazier et al. U.S. Pat. No. 2,681,897, issued June 22, 1954; Vasta U.S. Pat. No. 3,338,860, issued Aug. 29, 1967; Fisk et al. U.S. Pat. No. 3,365,414, issued Jan. 23, 1968; are excellent coating compositions which are very adequate for many uses but these compositions require a relatively high temperature to cure, i.e., cross-link, to a hard, tough, durable film. Lower temperatures can be used to cure coatings of these prior art compositions but a catalyst is required which substantially shortens the shelf life of the compositions. It is possible to increase the hydroxy and carboxyl content of the polymers in these prior art compositions to provide many extra sites for cross-linking the polymer. However, this creates other problems, such as, an increase in the hydroxy content of a polymer causes the polymer to become water sensitive and the coating may blister and an increase in the carboxyl content of the polymer decreases shelf life of the coating composition and can increase the viscosity of the coating composition to such a degree that the coating cannot be sprayed properly.

Each year, the auto industry uses more plastics, such as, styrene, polypropylene, copolymers of styrene/butadiene/acrylonitrile and the like, on autos. For example, one line of automobiles now has a plastic grill. However, these polymeric materials deform at the temperature (120° C. and higher) that is necessary to adequately cure and harden currently used coating compositions. It would be extremely desirable and economical to have a coating composition that would cure to a tough, hard film at a temperature that would not deform the plastic materials used in autos. Also, a lower baking temperature would have the obvious advantage of lower operating costs.

The novel thermosetting acrylic coating composition of this invention provides a coating that cures at a relatively low temperature, i.e., 95°–110° C., to a high quality tough, durable, film and the novel coating composition has an excellent shelf life. Because of these desirable characteristics, this novel composition is particularly useful in auto manufacturing for painting truck and auto bodies, and in particular, the plastic parts of auto and truck bodies, and also for repainting truck and auto bodies that have been repaired.

STATEMENT OF THE INVENTION

The liquid coating composition comprises 10–60 percent by weight of the polymer blend and a solvent for the polymer blend, in which the blend consists essentially of a. 5–65 percent by weight, based on the weight of the polymer blend, of Interpolymer A which consists essentially of
1. 10–25 percent by weight, based on the weight of Interpolymer A, of styrene;
2. 20–35 percent by weight, based on the weight of Interpolymer A, of methyl methacrylate;
3. 30–50 percent by weight, based on the weight of Interpolymer A of a soft constituent which is either an alkyl acrylate or an alkyl methacrylate, where the alkyl groups have 2–4 carbon atoms;
4. 10–20 percent by weight, based on the weight of Interpolymer A, of a hydroxy containing compound which is either a hydroxyalkyl acrylate or a hydroxyalkyl methacrylate wherein the alkyl groups contain 1–4 carbon atoms; and
5. 1–4 percent by weight of an $\alpha,\beta$ unsaturated monocarboxylic acid; said Interpolymer A having a relative viscosity of 1.08 to 1.14 measured at 25° C. in ethylene dichloride;

b. 65–5 percent by weight, based on the weight of the polymer blend, of Interpolymer B which consists essentially of
1. 35–55 percent by weight, based on the weight of Interpolymer B, of a hard constituent which is either styrene or methyl methacrylate;
2. 38–48 percent by weight, based on the weight of Interpolymer B, of a soft constituent described above;
3. 5–12 percent by weight, based on the weight of Interpolymer B, of a hydroxy containing compound described above; and
4. 2–10 percent by weight of an $\alpha,\beta$ ethylenically unsaturated monocarboxylic acid; said Interpolymer B having a relative viscosity of 1.04 to 1.08 measured at 25° C. in ethylene dichloride;

c. 20–40 percent by weight, based on the weight of the polymer blend, of a heat reactive condensate which is either an alkylolated melamine formaldehyde where the alkyl group has 3–4 carbon atoms or a blend of an alkylolated melamine formaldehyde and urea formaldehyde.

DESCRIPTION OF THE INVENTION

Preferably, the novel coating composition of this invention has a solids content of 35–45 percent by weight of the polymer blend.

The following polymer blends provide compositions that form coatings that have excellent physical properties:
1. 8–12 percent by weight of Interpolymer A, 58–62 percent by weight of Interpolymer B and 28–32 percent by weight of the heat reactive condensate;
2. 33–37 percent by weight of Interpolymer A; 33–37 percent by weight of Interpolymer B and 28–32 percent by weight of the heat reactive condensate;
3. 58–62 percent by weight of Interpolymer A; 8–12 percent by weight of Interpolymer B and 28–32 percent by weight of the heat reactive condensate.

Interpolymer A is prepared by conventional polymerization techniques in which the monomer constituents are blended with solvents and a polymerization catalyst and heated to 75°–150°C. for about 2–6 hours to form a polymer that has a relative viscosity of about 1.08–1.14 measured at 25° C., preferably about 1.085–1.100, a glass transition temperature of about 25°–45° C., and an acid number of about 15–25. In general, for best results, it is preferred that Interpolymer A has a substantially higher molecular weight than Interpolymer B. With some compositions, Interpolymer A may have a lower molecular weight than Interpolymer B.

The glass transition temperature of the polymer is determined by a Thermomechanical Analyzer, Model 940, sold by E. I. du Pont de Nemours and Company.

The "relative viscosity" is the value obtained by dividing the efflux time of a solution of the polymer by the efflux time of the solvent used to form the above polymer solution. The efflux times are measured according to the procedure of ASTM-D-445-46-T, Method B, using as the polymer solution 0.25 grams of the polymer in 50 cubic centimeters of ethylene dichloride as the solvent. The efflux times are measured at 25° C. in a standard apparatus, sold under the designation of a modified Ostwald Viscometer.

Typical solvents and diluents which are used to prepare the Interpolymer A and the coating composition of this invention are toluene, xylene, butyl acetate, acetone, methylisobutyl ketone, methylethyl ketone, butyl alcohol, and other aliphatic cycloaliphatic and aromatic hydrocarbons, esters, ethers, ketones, and alcohols, such as are conventionally used in coating compositions.

About 0.1–4 percent by weight, based on the weight of the monomer, of a polymerization catalyst is used to prepare Interpolymer A. Typical catalysts are ditertiary butyl peroxide, cumene hydroperoxide, azobisisobutyronitrile and the like.

Interpolymer A contains about 10–25 percent by weight of styrene and about 20–35 percent by weight methyl methacrylate. The soft constituent used to prepare Interpolymer A is either an alkyl acrylate or an alkyl methacrylate in which the alkyl group contains 2–4 carbon atoms. The following are typical monomers used as the soft constituent: ethyl acrylate, propyl acrylate, isopropyl acrylate, butyl acrylate, isobutyl acrylate, ethyl methacrylate, propyl methacrylate, isopropyl methacrylate, butyl methacrylate and the like. Butyl acrylate is the preferred soft constituent since it forms a polymer that has excellent physical properties which are particularly desirable for the novel coating composition of this invention.

Typical useful hydroxy containing compounds used for preparing Interpolymer A are hydroxy alkyl acrylates or hydroxyalkyl methacrylates in which the alkyl group contains 1–4 carbon atoms; for example, hydroxyethyl acrylate, hydroxypropyl acrylate, hydroxybutyl acrylate, and the like, hydroxymethyl methacrylate, hydroxyethyl methacrylate, hydroxypropyl methacrylate, hydroxybutyl methacrylate, and the like.

Typically useful $\alpha,\beta$-ethylenically unsaturated monocarboxylic acids used to prepare Interpolymer A are acrylic acid, methacrylic acid, crotonic acid, ethacrylic acid, propylacrylic acid, isopropylacrylic acid and the like. Preferred are acrylic acid and methacrylic acid since these acids form a high quality polymer. In some formulations, Interpolymer A can have an acid content as low as 0.5 percent by weight and still form a good quality coating composition.

One preferred composition of Interpolymer A which is of a particular high quality used to prepare the novel coating composition of this invention contains about 14–18 percent by weight styrene, 25–30 percent by weight methyl methacrylate, 38–42 percent by weight butyl acrylate, 12–16 percent by weight hydroxylethyl acrylate and 1–4 percent by weight acrylic acid and has an inherent viscosity of 1.085 to 1.100 measured at 25° C. in ethylene dichloride.

Interpolymer B used to form the novel coating composition of this invention is prepared by using the same polymerization procedure, polymerization catalyst and solvents as used to prepare Interpolymer A. Interpolymer B has a relative viscosity of about 1.04–1.08 measured at 25° C. in ethylene dichloride, preferably 1.055–1.065, a glass transition temperature of about 10°–20° C. and acid number of about 20–35, preferably 25–30.

The hard constituent of Interpolymer B is either styrene or methyl methacrylate. One preferred composition of Interpolymer B, which gives a high quality coating composition of this invention, contains 43–47 percent of the hard constituent.

The soft constituent used to prepare Interpolymer B is either an alkyl acrylate or methacrylate as described above for Interpolymer A. Butyl acrylate is the preferred constituent since it provides a polymer with excellent physical properties and does not hinder the curing of the polymer when baked.

Any of the aforementioned hydroxylalkyl acrylate or methacrylate constituents used to prepare Interpolymer A can be used to prepare Interpolymer B. One preferred hydroxy containing compound is hydroxyethyl acrylate since it gives a high quality polymer. Also, any of the aforementioned $\alpha,\beta$-ethylenically unsaturated mono-carboxylic acids can be used to prepare Interpolymer B. Preferred are acrylic acid and methacrylic acid. In some formulations, Interpolymer B can have an acid content as low as 0.5 percent by weight and still form a good quality coating composition.

One particularly preferred composition of Interpolymer B which gives an exceptionally high quality coating composition of this invention contains 43–47 percent by weight of styrene, or methyl methacrylate, 41–45 percent by weight butyl acrylate, 6–10 percent by weight hydroxyethyl acrylate and 2–6 percent by weight acrylic acid.

The third constituent of the novel coating composition of this invention is a heat reactive condensate which gives the composition its thermosetting characteristic and improves the composition's hardness, solvent resistance, alkali and heat resistance. About 20–40 percent by weight, based on the weight of the polymer blend, of the heat reactive condensate is used and preferably, about 28–33 percent by weight of the heat reactive condensate is used.

Preferred heat reactive condensates used to prepare the novel coating composition of the invention are alkylolated melamine formaldehyde resins or a mixture of an alkylolated melamine formaldehyde resin and urea formaldehyde. These preferred alkylolated melamine formaldehyde resins have 3–4 carbon atoms in the alkyl group and are those that are well known in the art. These resins are prepared by conventional techniques in which a lower alkyl alcohol such as butanol, isobutanol, propanol, isopropanol and the like is reacted with the melamine formaldehyde resin to provide pendent alkoxy group or groups. One preferred melamine resin used in this invention because of its availability and since it forms a high quality coating composition is a butylolated melamine formaldehyde.

Sucrose benzoate can be used in the novel coating composition of this invention in amounts of about 2–10 percent by weight, based on the weight of the polymer blend, used in the novel coating composition.

Up to 10 percent by weight, based on the weight of the polymer blend, of an organic plasticizer is an optional constituent that can be used to enhance the properties of the resulting finishes formed by the novel composition of this invention. Functional polymeric plasticizers which react with the constituents in the coating composition can be used such as, epoxidized soya bean oil, oil free and oil modified alkyds and polyesters, such as, polyorthophthalate esters, polyalkylene adipate esters or polyacrylene adipate esters.

Volatile non-functional monomeric plasticizers can also be used, such as butylbenzyl phthalate, dibutyl phahalate, triphenyl phosphate, 2-ethylhexylbenzyl phthalate, dicyclohexyl phthalate, diallyl phthalate, dibenzyl phthalate, butyl cyclohexyl phthalate, mixed benzoic acid and fatty oil acid esters of pentaerythritol, poly(propylene adipate)dibenzoate, diethylene glycol dibenzoate, tetrabutylthiodisuccinate, butyl phthalyl butyl glycolate, acetyltributyl citrate, dibenzyl sebacate, tricresyl phosphate, toluene ethyl sulfonamide, the di-2-ethylhexyl ester of hexamethylene diphthalate, di(methylcyclohexyl) phthalate.

Pigments are used in the novel coating composition of this invention in the amounts of 0.1–20.0 percent pigment volume concentration, preferably, a pigment volume concentration of about 0.3–6.0 percent is used. Examples of the great variety of pigments which are used in the novel coating composition of this invention are metallic oxides, preferably titanium dioxide, zinc oxide, and the like, metal hydroxides, metal flakes, chromates, such as lead chromate, sulfides, sulfates, carbonates, carbon black, silica, talc, china clay, iron blues, organic reds, maroons, organic dyes and lakes, etc.

Other additives can be incorporated into the novel coating composition of this invention such as, metallic soaps, e.g., nickel octoate, tin octoate, zirconium octoate; metallic naphthanates and silicone resins.

The novel coating compositions of this invention can be applied to a variety of substrates, for example, wood, glass, plastics, such as prolypropylene, styrene, copolymers of styrene and the like, and metal, by any of the usual application methods, such as spraying, electrostatic spraying, dipping, brushing, flow coating and the like. These coatings can be air dried or can be baked which minimizes the drying period. The resulting coating is about 1–5 mils thick, preferably 1–3 mils thick and can be rubbed or polished in accordance with conventional techniques, if desired, to improve smoothness or apparent gloss or both.

Preferably, the novel coating composition of this invention is applied over a suitably primed metal substrate. Typical alkyd primers or epoxy primers pigmented with iron oxide, carbon black, titanium dioxide and the like can be used. Also, the novel composition can be used directly over galvanized steel to form a durable coating. A sealer coat may be used over the primer coat to provide a particularly smooth and even surface over which the novel coating composition is then applied. Typical sealer compositions that can be used are disclosed in Rohrbacher U.S. Pat. No. 3,509,086, issued Apr. 28, 1970.

Primers on metal substrates which have been electrodeposited and then baked present adhesion problems and many conventional enamels do not have good adhesion to these primers. However, the novel coating composition of this invention has excellent adhesion to metal substrates primed with these vehicles that have been electrodeposited. Typical electrodeposited primer compositions have as the film-forming constituents about 50–95 percent by weight of a carboxylic acid polymer having an acid number of 5–200 and correspondingly about 5–50 percent by weight of a cross-linking agent.

The following are examples of carboxylic polymers used in these primer compositions; maleinized drying oils which are the reaction products of maleic anhydride and a drying oil such as linseed oil, dehydrated castor oil, tung oil, soya bean oil and the like; alkyd resins which are the reaction products of a polyhydric alcohol and a polybasic acid such as, drying oil fatty acids; esterified epoxy resins such as, an epoxy-hydroxy polyether resin esterified with conventional drying oil fatty acid; acrylic polymers; polyesters; trimellitic anhydride alkyd resins; styrene/allyl alcohol copolymers reacted with a carboxylic acid constituent and the like.

The following are typical cross-linking agents used with the above carboxylic polymers to form primers that can be electrodeposited: melamine formaldehyde, alkylolated melamine formaldehyde, urea formaldehyde, benzoguanamine formaldehyde, melamine toluene sulfonamide resins; one preferred cross-linking agent is hexamethoxy methylol melamine. Other cross-linking agents such as, amines and other compatible hydroxyl terminated compounds, can also be used.

These electrocoating polymers have a solids content of about 3–30 percent and are neutralized and the pH of the aqueous dispersion is adjusted to a pH of about 7.5 to 9 with a basic compound such as a hydroxide, e.g., potassium hydroxide; ammonia, amines and the like. Also, the composition contains about 0.1–30 percent by weight of pigments such as, carbon black, iron oxide, barrium chromate, lead silicate, strontium, chromate and the like. Surfactants may be added to disperse the film-forming polymer and water-miscible solvents may also be used to aid in the dispersion of the film-forming polymer.

These electrocoating compositions are applied using conventional electrocoating equipment and application voltages of about 50 to 500 volts are used but 100 to 300 volts are preferred. After application to the metal substrate, the coated substrate is preferably washed with water and then baked at about 150°–300° C. The novel coating composition of this invention is then applied using any of the aforementioned techniques.

After the novel coating composition is applied to a substrate, the coating preferably is cured at about 95°–100° C. for about 15–30 minutes. Surprisingly, even at this relatively low temperature and without the use of a catalyst, the novel composition of this invention gives a hard, durable and glossy coating which is suitable for auto bodies, truck bodies, appliances, outdoor equipment and the like. Higher baking temperatures such as 110°–140° C. can be used if desired.

The following Examples illustrate the invention. All quantities are on a weight basis unless otherwise indicated.

EXAMPLE 1

A coating composition is formed by first preparing the following polymer A solution:

| Portion 1 | Parts by Weight |
| --- | --- |
| Hydrocarbon solvent (Boiling point 150–190° C., aniline point −28°C.) | 1537 |
| Butyl alcohol | 615 |
| Ethylene glycol monoethyl ether acetate | 830 |
| Portion 2 | |
| Styrene monomer | 738 |
| Methyl methacrylate monomer | 1245 |
| Butyl acrylate monomer | 1845 |
| Hydroxyethyl acrylate monomer | 680 |
| Acrylic acid monomer | 105 |
| Ditertiary butyl peroxide | 92 |
| Portion 3 | |
| Butyl acetate (90% n-butyl acetate in 10% butyl alcohol) | 698 |
| Total | 8385 |

Portion 1 is premixed and then charged into a reaction vessel equipped with a stirrer, a thermometer and a heating element and the ingredients are heated to 130° C. Portion 2 is premixed and then added to Portion 1 and the reaction mixture is heated to its reflux temperature of about 135° C. and held at this temperature for about 3.5 hours then Portion 3 is added. The resulting polymer A solution has a polymer solids content of 55 percent and a Gardner Holdt viscosity measured at 25° C. of about W to Y. The resulting polymer A has the following composition: styrene/methyl methacrylate/butyl acrylate/hydroxyethyl acrylate/acrylic acid in a weight ratio of 16/27/40/14.5/2.5/.

The polymer has an acid number of about 16–20, a glass transition temperature of about 32° C. and a relative viscosity of about 1.09 measured in ethylene dichloride at 25° C. measured according to ASTM–D–445–46–T– Method B.

A second polymer B solution is prepared to form a coating composition:

| Portion 1 | Parts by Weight |
| --- | --- |
| Hydrocarbon solvent (Boiling point 150–190°C., aniline point −28°C.) | 1537 |
| Butyl alcohol | 615 |
| Ethylene glycol monoethyl acetate | 830 |
| Portion 2 | |
| Styrene monomer | 2285 |
| Butylacrylate monomer | 2186 |
| Hydroxyethyl acrylate monomer | 400 |
| Acrylic acid monomer | 190 |
| Ditertiary butyl peroxide | 147 |
| Total | 8190 |

Portion 1 is premixed and then charged into a reaction vessel equipped as described above.

The ingredients are heated to 140° C. and then portion 2 is premixed and is added to the reaction vessel. The reaction mixture is heated to its reflux temperature of about 140° C. and held at this temperature for about 3.5 hours. The resulting polymer B solution has a polymer solids content of about 60 percent and a Gardner Holdt viscosity of about Y to Z measured at 25° C.

The resulting polymer B has the following composition: styrene/butyl acrylate/hydroxyethyl acrylate/acrylic acid in a weight ratio of 45/43/8/4. The polymer has an acid number of 25–30, a glass transition temperature of about 15° C. and a relative viscosity of about 1.06 measured in ethylene dichloride at 25° C. measured according to ASTM D–445–46 –T Method B.

A coating composition is then formulated from the above prepared polymer A and polymer B solutions by blending the following ingredients:

| | Parts by Weight |
| --- | --- |
| Polymer A solution (55% polymer solids) | 3114 |
| Polymer B solution (60% polymer solids) | 356 |
| Butylated Melamine Formaldehyde resin solution (55% solids solution in n-butanol) | 1786 |
| Methanol | 308 |
| Xylol | 1107 |
| Anhydrous isopropanol | 396 |
| Total | 7067 |

The resulting coating composition has an excellent shelf life as shown by the following test. A sealed pint can of the above prepared coating composition is exposed to 60° C. for 2 weeks. Only a slight increase in viscosity is noted at the end of the two week period and the coating composition is still useful at the end of this test period. One week exposure to 60° C. is considered to be equal to 5 years shelf life.

The above prepared coating composition is reduced to a spray viscosity with a conventional enamel thinner and is sprayed onto a steel panel primed with a 1.5 mil thick iron oxide pigmented epoxidized alkyd resin primer. The coating is baked for about 30 minutes at 108° C. and results in a hard, fully cured film about 1.8 mils thick which is resistant to blistering by high humidity, highly chip resistant, resistant to solvents and resistant to deterioration by weathering.

EXAMPLE 2

The following coating composition is formed by first preparing polymer C solution.

|  | Parts by Weight |
|---|---|
| Portion 1 |  |
| Hydrocarbon solvent (described in Example 1) | 1891 |
| Ethylene glycol monoethyl ether acetate | 1162 |
| Butyl alcohol | 231 |
| Portion 2 |  |
| Methyl methacrylate monomer | 2321 |
| Butyl acrylate monomer | 2220 |
| Hydroxyethylacrylate monomer | 420 |
| Acrylic acid | 200 |
| Ditertiary butyl peroxide | 155 |
| Total | 8600 |

Portion 1 is premixed and charged into a reaction vessel as described in Example 1 and heated to 130° C. Portion 2 is then premixed and charged into the reaction vessel and the ingredients are heated to the reflux temperature of 135° C. for about 3.5 hours. The resulting polymer C solution has a polymer solids content of about 60 percent and a Gardner Holdt viscosity of about Z to $Z_2$ measured at 25° C.

The resulting polymer C has the following composition: methyl methacrylate/butyl acrylate/hydroxyethyl acrylate/acrylic acid in a weight ratio of 45/43/8/4. The polymer has an acid number of 25–30, a glass transition temperature of about 16° C. and a relative viscosity of about 1.07 measured in ethylene dichloride solvent at 25° C. according to ASTM–D–4 45–46–T, Method B.

A coating composition is then formulated from the above prepared polymer C solution and polymer A solution by using the identical ingredients and procedure used to prepare the coating composition of Example 1 except polymer C solution is used instead of polymer B solution.

The resulting coating composition has an excellent shelf life as shown by the following test. A sealed pint can of the above prepared coating composition is exposed to 60° C. for 2 weeks. Only a slight increase in viscosity is noted at the end of the two week period and the coating composition is still useful at the end of this test period. One week exposure to 60° C. is considered to be equal to 5 years shelf life.

The above prepared coating composition is reduced to a spray viscosity with a conventional enamel thinner and is sprayed onto a steel panel primed with a 1.5 mil thick iron oxide pigmented epoxidized alkyd resin primer. The coating is baked for about 30 minutes at 108° C. and results in a hard, fully cured film about 1.8 mils thick which is resistant to blistering by high humidity, highly chip resistant, resistant to solvents and resistant to deterioration by weathering.

EXAMPLE 3

A polymer D solution is prepared as follows:

|  | Parts by weight |
|---|---|
| Portion 1 |  |
| Hydrocarbon solvent (described in Example 1) | 1456 |
| Xylol | 1566 |
| Butyl alcohol | 219 |
| Portion 2 |  |
| Styrene monomer | 2429 |
| Butyl acrylate monomer | 1845 |
| Hydroxyethyl acrylate monomer | 396 |
| Acrylic acid monomer | 187 |
| Ditertiary butyl peroxide | 97 |
| Tertiary butyl peracetate | 65 |
| Total | 8260 |

Portion 1 is premixed and charged into a reaction vessel as described in Example 1 and heated to about 130° C. Portion 2 is premixed and slowly added to the reaction vessel over a 2-hour period while the reaction mixture is held at its reflux temperature at about 135° C. After Portion 2 is added, the reaction mixture is held at its reflux temperature for an additional 1½ hours. The resulting polymer D solution has a polymer solids content of about 60 percent and a Gardner Holdt viscosity of X to Z measured at 25° C.

The resulting polymer D has the following composition: styrene/butyl acrylate/hydroxy ethyl acrylate/acrylic acid in a weight ratio 50/38/8/4. The polymer has an acid number of 27–30 and a relative viscosity of about 1.06 measured in ethylene dichloride solvent at 25° C. according to ASTM–D–4 45–46–T, Method B.

A mill base it then formulated as follows:

|  | Parts by weight |
|---|---|
| Polymer D solution (60% solids) | 250 |
| Titanium Dioxide pigment (Rutile) | 600 |
| Xylol | 150 |
| Total | 1000 |

The above ingredients are premixed and ground on a conventional sand mill using two passes to a 0.5 mil fineness.

A coating composition is then prepared by blending the following ingredients:

|  | Parts by weight |
|---|---|
| Mill base (prepared above) | 268 |
| Polymer D solution (60% solids) | 56 |
| Polymer A solution (55% solids) | 234 |
| Butylated Melamine formaldehyde resin solution (55% solids in n-butanol) | 234 |
| Methanol | 31 |
| Isopropanol | 31 |
| Aromatic hydrocarbon solvent | 55 |
| Total | 909 |

The above prepared coating composition is reduced to a spray viscosity with a conventional enamel thinner and is sprayed onto a steel panel primed with a 1.5 mil thick iron oxide pigmented epoxidized alkyd resin primer. The coating is baked for about 30 minutes at 108° C. and results in a hard, fully cured film about 1.8 mils thick which is resistant to blistering by high humidity, highly chip resistant, resistant to solvents and resistant to deterioration by weathering.

EXAMPLE 4

An electrocoating composition is prepared by blending the following ingredients to form a vehicle composition:

|  | Parts by Weight |
|---|---|

| | Parts by Weight |
|---|---|
| Linseed oil/maleic anhydride copolymer (Acid No. 170, Gardner Holdt viscosity of T at 25°C. measured at 75% polymer solids in xylene) | 32.66 |
| N-isopropyl-n'-phenol-p-phenylene diamine | 0.21 |
| Diethylamine | 3.47 |
| Deionized water | 57.15 |
| Formaldehyde solution (37% formaldehyde in a water/methanol solution) | 0.11 |
| Total | 93.60 |

A mill base is then prepared by blending the following ingredients and then sand-grinding the ingredients in a conventional sand mill to 0.5 mil fineness:

| | Parts by Weight |
|---|---|
| Linseed oil/maleic anhydride copolymer (described above) | 1.01 |
| Deionized water | 3.31 |
| Nonionic surfactant ("Witco" 912) | 0.10 |
| Carbon black pigment | 1.50 |
| Strontium chromate pigment | 0.48 |
| Total | 6.40 |

The mill base is then thoroughly blended with the above vehicle composition and this blend is then reduced to 7.0 percent solids with the deionized water and the composition is then placed in a conventional electrocoating cell.

Steel panels are then immersed in the electrocoating cell and form the anode of the cell. A direct current of 150 volts is applied for 90 seconds and a coating is electrodeposited on the panels. The panels are removed from the bath and rinsed with deionized water and then baked for 30 minutes at 200° C.

The coating composition of Example 3 is reduced to a spray viscosity with a conventional enamel thinner and is sprayed onto the primed panels prepared above. The coating is baked for about 30 minutes at 108° C. and the resulting finish is a fully cured film about 1.8 mils thick which has excellent adhesion to the primed substrate and is resistant to blistering by high humidity, highly chip resistant, resistant to solvents and resistant to weathering.

EXAMPLE 5

Polymer E solution is prepared as follows:

| portion 1 | Parts by Weight |
|---|---|
| Hydrocarbon solvent (boiling point 150–190°C., aniline point –28°C.) | 1525 |
| Ethylene glycol monoethylether acetate | 915 |
| Butyl alcohol | 520 |
| Anhydrous isopropyl alcohol | 91 |
| Portion 2 | |
| Styrene monomer | 799 |
| Methyl methacrylate monomer | 1237 |
| Butyl acrylate monomer | 1832 |
| 2-Hydroxyethyl acrylate monomer | 666 |
| Acrylic acid monomer | 46 |
| Di-tertiary-butyl peroxide | 76 |
| Portion 3 | |
| Butyl acetate | 693 |
| Total | 8400 |

Portion 1 is premixed and then charged into a reaction vessel equipped with a stirrer, a thermometer and a heating element and the ingredients are heated to about 125° C. Portion 2 is premixed and then slowly added to Portion 1 over a 2-hour period while maintaining the reaction mixture at its reflux temperature. The reaction mixture is maintained at its reflux temperature until the reaction mixture reaches a constant Gardner Holdt viscosity of about $Z_1-Z_2$ measured at 25° C. The resulting polymer E solution has a solids content of about 55 percent and the polymer has an acid number of about 8–10.

A second polymer F solution is prepared as follows:

| Portion 1 | Parts by Weight |
|---|---|
| Hydrocarbon solvent (boiling point 150–190°C., aniline point –28°C.) | 1462 |
| Xylol | 1570 |
| Butyl alcohol | 218 |
| Portion 2 | |
| Styrene monomer | 2582 |
| Butyl acrylate monomer | 1852 |
| 2-hydroxyethyl acrylate | 390 |
| Acrylic acid monomer | 49 |
| Di-tertiary-butyl peroxide | 117 |
| Total | 8240 |

Portion 1 is charged into a reaction vessel described as above and heated to its reflux temperature of about 140° C. Portion 2 is premixed and slowly added to the reaction vessel over a 2-hour period while maintaining the reaction mixture at its reflux temperature of about 140° C. The reaction mixture is held at its reflux temperature until the resulting polymer solution reaches a constant Gardner Holdt viscosity of about X to Z measured at 25° C. The resulting polymer solution has a polymer solids content of about 60 percent and the polymer has an acid number of about 7–9.

A coating composition is then prepared by blending the following ingredients:

| Portion 1 | Parts by Weight |
|---|---|
| Polymer E solution (55% solids) | 86.10 |
| Polymer F solution (60% solids) | 258.94 |
| Butylated melamine formaldehyde resin solution (55% polymer solids in butanol) | 182.84 |
| Hydrocarbon solvent (described above) | 60.00 |
| White Mill Base (63% titanium dioxide, 25% polymer D solution, 4% toluene, 4% isopropanol, 4% aliphatic hydrocarbon solvent) | 226.44 |
| Portion 2 | |
| Methanol | 16.00 |
| Portion 3 | |
| Xylol | 71.68 |
| Total | 902.00 |

The ingredients in Portion 1 are charged in their respective order into a mixing vessel and after each addition thoroughly blended together and then mixed for an additional 15 minutes. Portion 2 is then added and thoroughly blended with the ingredients of Portion 1 and similarly Portion 3 is then added and blended into the above ingredients to provide a white thermosetting acrylic enamel.

The above prepared coating composition is reduced to a spray viscosity with the conventional enamel thinner and is sprayed onto a steel panel primed with about 1.5 mil thick iron oxide pigment epoxidized alkyd resin primer. The coating is baked for about 30 minutes at 108° C. and results in a hard, fully cured film about 1.8 mils thick which is resistant to blistering by high humidity, highly chip resistant, resistant to solvents and resistant to deterioration by weathering. The above prepared coating composition is also applied as above to a steel panel coated with the electrodeposited primer composition of Example 4 and baked as above. The resulting finish has properties similar to those listed above.

A green coating composition is prepared by blending the following ingredients:

| Portion 1 | Parts by Weight |
|---|---|
| Polymer F solution (60% solids) | 215.96 |

| | |
|---|---|
| Polymer E solution (55% solids) | 93.77 |
| Butylated melamine formaldehyde resin solution (55% solids in n-butanol) | 188.84 |
| Aluminum flake dispersion (17% aluminum paste comprising 65% aluminum flake dispersed in mineral spirits; 68% polymer A solution, 15% xylol) | 95.63 |
| Green gold dispersion (15% pigment of a nickel azo complex, 67% polymer D solution, 5% toluene, 8% aliphatic hydrocarbon and 5% isopropanol) | 57.31 |
| Irgazine yellow dispersion (10% tetrachloroisoindoline pigment, 55% polymer B solution, 20% xylol and 15% butyl acetate) | 9.37 |
| Carbon black dispersion (6% carbon black pigment, 70% polymer D solution, 22% aromatic hydrocarbon solvent, 2% nickel octoate solution) | 2.49 |
| Copper phthalocyanine green dispersion (12% copper phthaolcyanine green pigment, 33% polymer D solution, 5% toluene and 50% butyl acetate) | 2.37 |
| Portion 2 | |
| Xylol | 143.26 |
| Total | 809.00 |

The ingredients in Portion 1 are added in the above order to a vessel and thoroughly blended after each addition and after the ingredients of Portion 1 are added, the mixture is blended for an additional 15 minutes. Portion 2 is then added and thoroughly blended into the mixture.

The above prepared coating composition is reduced to a spray viscosity with a conventional enamel thinner and sprayed onto a steel panel primed with a 1.5 mil iron oxide pigmented epoxidized alkyd resin primer and also sprayed onto a steel panel which has been electrocoated with the primer composition of Example 4. In each case, the coating is baked for about 30 minutes at 108° C. and results in a hard, fully cured film about 1.8 mils thick which is resistant to blistering by high humidity, highly chip resistant, resistant to solvents and resistant to deterioration by weathering.

I claim:

1. A coating composition comprising 10–60 percent by weight of a polymer blend and a solvent for said polymer blend wherein said polymer blend consists essentially of
   a. 5–65 percent by weight, based on the weight of the polymer blend, of Interpolymer A which consists essentially of
      1. 10–25 percent by weight, based on the weight of Interpolymer A, of styrene,
      2. 20–35 percent by weight of methyl methacrylate,
      3. 30–50 percent by weight of a soft constituent selected from the group consisting of an alkyl acrylate and an alkyl methacrylate where the alkyl groups have 2–4 carbon atoms,
      4. 10–20 percent by weight of a hydroxy containing compound selected from the group consisting of a hydroxyalkyl acrylate and a hydroxyalkyl methacrylate wherein the alkyl groups contain 1–4 carbon atoms, and
      5. 1–4 percent by weight of an $\alpha,\beta$-ethylenically unsaturated monocarboxylic acid;
      said Interpolymer A having a relative viscosity of 1.08 to 1.14 measured at 25° C. in ethylene dichloride; and
   b. 65–5 percent by weight, based on the weight of the polymer blend, of Interpolymer B which consists essentially of
      1. 35–55 percent by weight of a hard constituent selected from the group consisting of styrene and methyl methacrylate,
      2. 38–48 percent by weight of said soft constituent;
      3. 5–12 percent by weight of said hydroxy containing compound; and
      4. 2–10 percent by weight of an $\alpha,\beta$-ethylenically unsaturated monocarboxylic acid;
      said Interpolymer B having a relative viscosity of 1.04 to 1.08 measured at 25° C. in ethylene dichloride;
   c. 20–40 percent by weight, based on the weight of the polymer blend, of a heat reactive condensate selected from the group consisting of an alkylolated melamine formaldehyde resin where the alkyl group contains 3–4 carbon atoms or a blend of said melamine formaldehyde resin and a urea formaldehyde resin.

2. The coating composition of claim 1 which contains pigment in a pigment volume concentration of 0.1 to 20 percent by weight and a polymer solids content of 35–45 percent by weight.

3. The coating composition of claim 2 in which Interpolymer A has a relative viscosity of about 1.085–1.100 and Interpolymer B has a relative viscosity of 1.055 to 1.065, wherein the relative viscosity is measured at 25° C. in ethylene dichloride.

4. The coating composition of claim 3 in which the $\alpha,\beta$-ethylenically unsaturated monocarboxylic acid of Interpolymers A and B is selected from the group consisting of acrylic acid and methacrylic acid.

5. The coating composition of claim 4 in which the heat reactive condensate is a butylolated melamine formaldehyde resin.

6. The coating composition of claim 5 in which the soft constituent of Interpolymers A and B is butyl acrylate, the hydroxy containing compound of Interpolymers A and B is hydroxyethyl acrylate and the hard constituent of Interpolymer B is styrene.

7. The coating composition of claim 2 in which Interpolymer A consists essentially of 10–25 percent by weight styrene, 20–35 percent by weight methyl methacrylate, 30–50 percent by weight butyl acrylate, 10–30 percent by weight hydroxy ethyl acrylate, 1–4 percent by weight acrylic acid and in which Interpolymer B consists essentially of 35–55 percent by weight styrene, 38–48 percent by weight butyl acrylate, 5–12 percent by weight hydroxyethyl acrylate, 2–10 percent by weight acrylic acid.

8. The coating composition of claim 1 which comprises 35–45 percent by weight of a thermosetting acrylic polymer blend and a solvent for said polymer blend wherein said polymer blend consists essentially of
   a. 58–62 percent by weight, based on the weight of the polymer blend, of Interpolymer A which consists essentially of
      1. 14–18 percent by weight based on the weight of Interpolymer A, of styrene,
      2. 25–30 percent by weight methyl methacrylate,
      3. 38–42 percent by weight butyl acrylate,
      4. 12–16 percent by weight hydroxyethyl acrylate and
      5. 1–4 percent by weight acrylic acid; said Interpolymer A having an inherent viscosity of 1.085 to 1.100 measured at 25° C. in ethylene dichloride;
   b. 8–12 percent by weight, based on the weight of the polymer blend, of Interpolymer B which consists essentially of
      1. 43–47 percent by weight based on the weight of Interpolymer B, of styrene;
      2. 41–45 percent by weight of butyl acrylate;
      3. 6–10 percent by weight hydroxyethyl acrylate; and
      4. 2–6 percent by weight of acrylic acid;
      said Interpolymer B having an inherent viscosity of 1.055 to 1.065 measured at 25° C. in ethylene dichloride;
   c. 28–32 percent by weight, based on the weight of the polymer blend, of a butylolated melamine formaldehyde resin.

9. The coating composition of claim 8 in which the styrene constituent of Interpolymer B is replaced with methyl methacrylate.

10. A metal substrate coated with a 1–5 mil dried coalesced layer of the coating composition of claim 1.

11. A ferrous metal substrate having a pigmented primer layer coated with a 1–5 mil dried coalesced layer of the coating composition of claim 1.

12. A plastic substrate coated with a 1–5 mil dried coalesced layer of the coating composition of claim 1.

* * * * *